Sept. 25, 1956
W. C. FULTON
2,764,621
ODORLESS SOLVENT NAPHTHA
Filed July 12, 1954
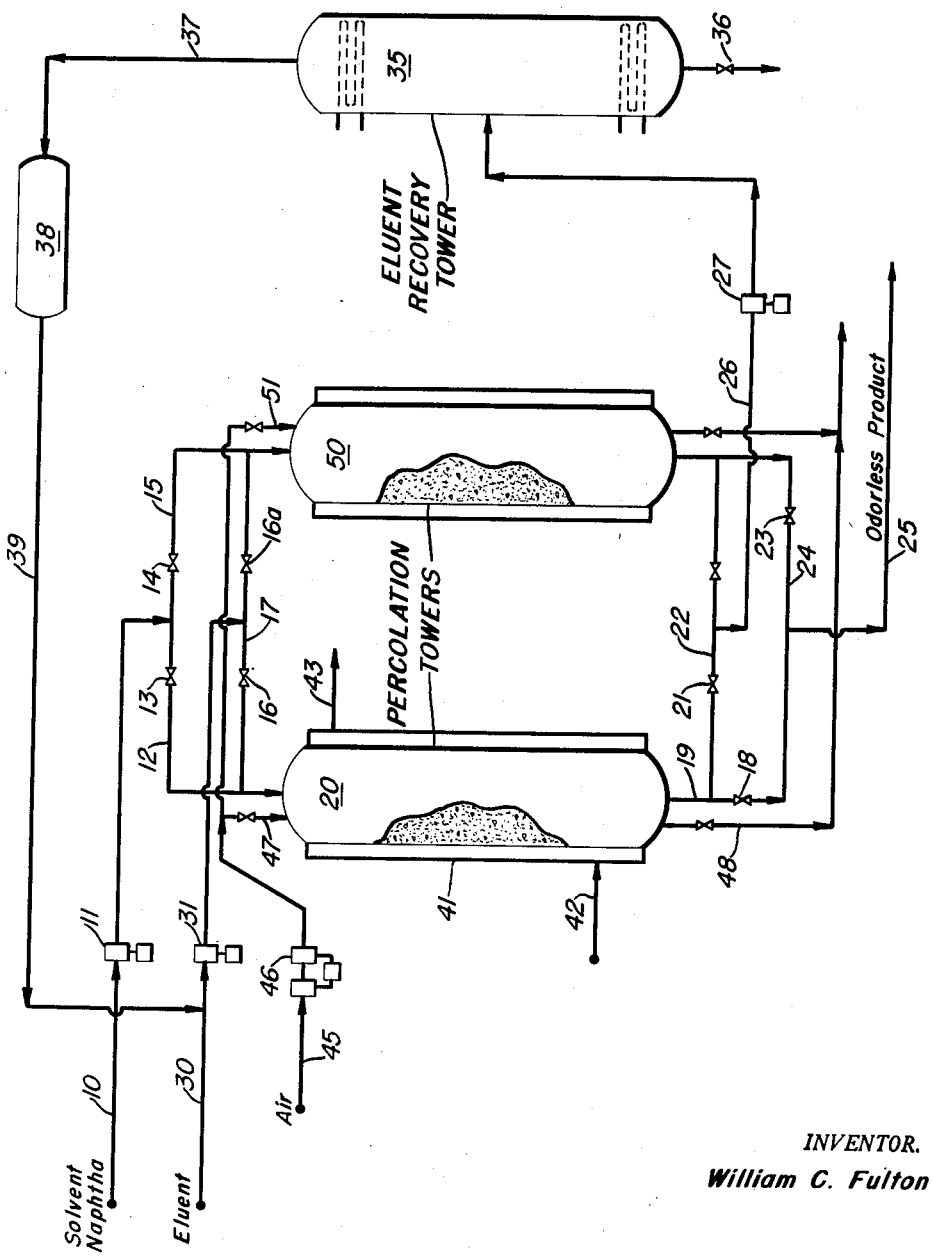
INVENTOR.
William C. Fulton

United States Patent Office 2,764,621
Patented Sept. 25, 1956

2,764,621

ODORLESS SOLVENT NAPHTHA

William C. Fulton, La Marque, Tex., assignor to The American Oil Company

Application July 12, 1954, Serial No. 442,755

10 Claims. (Cl. 260—676)

This invention relates to odorless petroleum naphtha. More particularly, the invention relates to solvent naphthas such as painters' naphtha, which naphthas must have a minimum of the so-called naphtha odor.

Petroleum naphthas have been used for many years in the paint and varnish industry as solvents. More recently, petroleum naphthas are being used in the syntheic resin industry as solvents. The primary objection to the use of petroleum naphthas in these fields has been the odor of the naphtha. Naphthas that are essentially free of sulfur compounds still possess a characteristic kerosene-like odor. Efforts have been made by the petroleum industry toward the production of a so-called odorless solvent naphtha for use as a solvent in the paint, varnish, and resin trades.

An object of this invention is the production of an essentially odorless and non-corrosive solvent naphtha suitable for use in the paint, varnish, and resin trades. Another object is the preparation of an odorless and non-corrosive naphtha derived from petroleum hydrocarbons. A particular object is an odorless solvent naphtha derived from a synthetic mixture of paraffinic hydrocarbons derived from petroleum conversion processes. A specific object is the production of an odorless and non-corrosive naphtha by contacting the naphtha containing odor-affording components and distilling within the range of from about 350° F. to about 425° F., said naphtha being a fraction of a paraffinic naphtha derived from acid catalyzed alkylation of butenes and isobutane. A still further object of the invention is the production of an odorless solvent naphtha as a fraction of a butene-isobutane alkylate, said fraction boiling within the range of from about 350° F. to 425° F., by contacting said fraction with silica gel and periodically regenerating the silica gel by removing therefrom adsorbed odor-affording contaminants by means of an alcohol-aromatic hydrocarbon wash. Other objects will become apparent from the detailed description of the invention hereinbelow.

Solvent naphthas having an odor quality suitable for use in the paint, varnish, and resin trades are produced according to my process by the steps of (1) contacting at ambient temperatures with silica gel a naphtha feed containing odor-affording contaminant, said naphtha having been derived from hydrocarbons containing from 3 to 5 carbon atoms, the naphtha feed being characterized as boiling within the range of from about 350° F. to 425° F., and further characterized as being essentially free of aromatic hydrocarbons, sulfur compounds, and free sulfur, said contacting being at a rate within the range of from about 10 barrels to about 30 barrels of said naphtha feed per ton of silica gel per hour for a total contact of feed with the silica gel not in excess of about 50 or 60 barrels per ton of silica gel, (2) separating said naphtha from silica gel contacted in step 1 to obtain said solvent substantially free of odor-affording contaminant, (3) contacting said silica gel with a mixture consisting of at least one alcohol having from 1 to 3 carbon atoms in the admixture with at least one aromatic hydrocarbon selected from the class consisting of benzene and toluene, said mixture containing at least about 20% by volume and not more than about 80% by volume of said alcohol, to obtain an alcohol-aromatic hydrocarbon solution of odor-affording contaminant, (4) separating said silica gel of step 3 from the alcohol-aromatic hydrocarbon solution of step 3, (5) removing adsorbed alcohol and aromatic hydrocarbon from the separated silica gel of step 4, (6) separating by distillative fractionation odor-producing contaminant from said alcohol-aromatic hydrocarbon solution of contaminant obtained in step 3, and (7) recycling said separated-aromatic hydrocarbon mixture of step 6 to step 3 of the process. The yield of odorless naphtha, based on barrels per ton of silica gel per cycle, between periods of regeneration of the silica gel as described above can be increased substantially if the naphtha fraction is subjected to a sulfuric acid treat and clay contacting operation prior to contact with a silica gel. My process is particularly adaptable for the production of an odorless solvent naphtha derived from alkylate and boiling within the range of from about 350° F. to about 425° F.

The feed to my process is composed essentially of a mixture of isoparaffinic hydrocarbons, i. e., the feed is essentially free of aromatic hydrocarbons and sulfur-affording material. However, very small amounts of organic sulfur compounds may be present. The feed is essentially free of hydrogen sulfide and elemental sulfur. The phrase "essentially free of sulfur-affording components" is used in this specification and in the claims to designate a maximum of 0.02% by weight sulfur in the feed to the process. Usually the weight percent sulfur is not greater than about 0.01% by weight of the solvent naphtha.

The most suitable feed to the process is derived from hydrocarbons containing from 3 to 5 carbon atoms, which hydrocarbons have interacted to produce a mixture of essentially isoparaffinic hydrocarbons to produce a naphtha of boiling range from which the solvent naphtha of the desired boiling range can be fractionated. In general, the solvent naphtha should distill in the ASTM distillation test between about 350° F. and 425° F. A naphtha having a lower initial boiling range may be acceptable for some uses.

The mixture of hydrocarbons serving as a suitable source for the feed to my process is derived by the alkylation of an olefin containing from 3 to 5 carbon atoms with an isoparaffin containing from 4 to 5 carbon atoms, i. e., the feed naphtha may be derived from the product of an alkylation reaction between an olefin selected from the class consisting of propene, butenes, and pentenes, and isoparaffin selected from the class consisting of isobutane and isopentane. Another suitable source of feed naphtha to the process is a mixture of hydrocarbons obtained by the polymerization of olefins containing from 3 to 5 carbon atoms, a polymeric product being hydrogenated to form a mixture of essentially isoparaffinic hydrocarbons, i. e., the feed naphtha may be derived from the hydrogenated polymers of an olefin selected from the class consisting of propene, butenes, and pentenes.

Many processes are known for the preparation of materials of the type described above. For example, a suitable source of feed naphtha is the total alkylate or fraction thereof derived from the acid catalyzed alkylation of butenes and isobutane, which reactants have been obtained from petroleum refining operations. Typical acid catalysts are liquid hydrogen fluoride and sulfuric acid. Another example of a process for the preparation of a suitable feed is the polymerization of a refinery propene-butene stream over a supported phosphoric acid catalyst to produce polymers which may be hydrogenated to isocodimer. The polymer boils over a wide boiling range and this unsaturated product is hydrogenated in the presence of a catalyst to produce an essentially saturated wide boiling range product commonly known as isocodimer.

The preferred feed to the process of this invention is derived from the heavy-alkylate fraction of a cold-acid alkylation process utilizing petroleum refinery butenes and isobutane as a feed to the alkylation reaction. This material is essentially free of olefins and contains only a very minor amount of organic sulfur compounds and essentially no aromatic compounds. A typical heavy alkylate from which I obtain the preferred 350° F. to 425° F. has an ASTM boiling range of from about 315° F. to about 600° F. I prefer to obtain the 350° F. to 425° F. fraction from such an alkylate under conditions to avoid decomposition of any small amount of organic sulfur compounds which may be present in very minor amounts in the alkylate.

The detailed description of the process of this invention is made in conjunction with the annexed drawing, which drawing forms a part of this specification. The drawing shows in schematic form a preferred method of carrying out the process. Many details of equipment have been omitted as these may be readily supplied by those skilled in the art.

Referring now to the drawing, a fraction of an alkylate as described above and boiling preferably within the range of from about 350° F. to 425° F. is passed through line 10 by means of pump 11 to manifold line 12 and thence to percolation tower 20, valve 13 in line 12 being in the open position and valve 14 in line 15 and valve 16 in line 17 being in the closed position. This alkylate fraction, otherwise designated as solvent naphtha, is odor-bearing but otherwise meets specifications as a painters' naphtha and for use in the varnish and resin trades. The naphtha feed is usually a water-white color, i. e., +30 true color, and the sulfur content is not in excess of about 0.02% by weight. The naphtha is substantially free of aromatic hydrocarbons consisting predominantly of a mixture of isoparaffinic hydrocarbons. The alkylate fraction may have been subjected to an acid treatment and clay percolation prior to contact with a silica gel as described below in Example III.

In percolation tower 20 the naphtha is contacted at ambient temperatures with silica gel suitably of such a size as to pass through a #14 U. S. Standard sieve and retained on a #20 U. S. Standard sieve. The naphtha contacts the silica gel at a rate of about 10 to 30 barrels, for example about 20 barrels of naphtha, per ton of silica gel per hour. With valve 18 in bottom draw-off line 19 in the open position and valve 23 in line 24 and valve 21 in line 22 in the closed position, the alkylate fraction passes via lines 19, 24, and 25 to product storage as substantially odorless product. After the silica gel in tower 20 has been on-stream sufficiently long for the deodorizing of about 50 barrels of the solvent naphtha per ton of silica gel, the silica gel is put on-stream for the regeneration cycle described below. In attempts to deodorize the above alkylate fraction, I have found that treatment with concentrated sulfuric acid, i. e., 98% acid, percolation through clay, or a combination of successive treatment by these methods, failed to remove odor-affording contaminants from the naphtha. Treatment of an acid treated-clayed alkylate naphtha with metallic sodium at elevated temperatures as high as 230° F. did not decrease the odor. Silica gel is effective only at relatively low percolation yields. Hence it is highly desirable that the silica gel respond to complete regeneration in order that it may be reused for the removal of the odor-affording bodies from the naphtha.

When the silica gel in tower 20 has been contacted with the solvent naphtha to a yield of about 50 barrels per ton of silica gel, the gel must be regenerated in order that the selectivity of the gel for the adsorption of odor-affording contaminants in the naphtha be maintained. I have found that a mixture of a low boiling aliphatic alcohol such as methanol, ethanol, isopropanol, or normal propanol with a low boiling aromatic hydrocarbon such as benzene or toluene is effective for the regeneration of the silica gel spent in the deodorizing of the alkylate naphthas. Neither the alcohol alone nor the aromatic hydrocarbon alone nor paraffins such as pentane or hexane alone or when used to follow a wash of alcohol alone is effective for the regeneration of the silica gel. The ratio of alcohol to aromatic hydrocarbon in the mixture should be within the range of from about 20 to about 80 parts by volume of alcohol per about 80 to about 20 parts by volume of aromatic hydrocarbon in the mixture. Generally, I prefer relative proportions of these two classes of compounds in the mixture corresponding to the vapor-liquid equilibrium proportions in their respective azeotropic boiling mixtures, thus to obtain separation of the mixed diluent from the odor-affording contaminant by distillative fractionation at the lowest possible temperature without resorting to reduce pressure fractionation. For example, if an ethanol-benzene mixture or an isopropanol-benzene mixture is used as diluent to remove adsorbed odor-affording contaminants from the silica gel, the preferred mixture is about 35 parts by volume of the alcohol and 65 parts by volume of the benzene. Information with respect to boiling points of azeotropes of mixtures of aliphatic alcohols with aromatic hydrocarbons of this invention and percentage compositions of such azeotropic mixtures is given in Azeotrope Data, Advances in Chemistry, Series 6, published by the American Chemical Society in June 1952.

Eluent in line 30, consisting of about 35 parts of isopropyl alcohol and 65 parts of benzene (by volume), is passed by means of pump 31 to line 17 and thence via line 12 to the bed of silica gel in percolation tower 20, after placing valve 13 in line 12 and valve 16a in line 17 in the closed position and opening valve 16 in line 17. The volume of the mixture of alcohol with aromatic hydrocarbon used for washing the silica gel in the regeneration step will usually be within the range of from about 0.5 to 3 volumes of the eluent per bulk volume of the silica gel in tower 20, for example, about 2 volumes of mixed aromatic hydrocarbon and alcohol per volume of silica gel. This washing or percolation operation is carried out at ambient temperatures. The eluent mixture is passed from tower 20 via lines 19, 22, and 26 by means of pump 27 to eluent recovery tower 35 for recovery of the isopropanol-benzene mixture. In tower 35 the odor-affording contaminants are separated from the solution thereof in the eluent and are withdrawn as bottom product from tower 35 through line 36 and the mixture of isopropanol and benzene, in substantially a ratio thereof corresponding to the ratio of these in the mixed vapor from their azeotropic mixture, boiling at about atmospheric pressure, is taken overhead through line 37 to accumulator 38 whence this mixture may be recycled through line 39 which joins eluent feed line 30.

After the odor-affording contaminants, adsorbed from the naphtha by the silica gel, have been removed from the silica gel by the alcohol-aromatic hydrocarbon mixture, the alcohol and aromatic hydrocarbon, i. e., isopropyl alcohol and benzene, must be desorbed from the silica gel. I have found that this desorption may be accomplished by subjecting the bed of silica gel to contact with a stream of air or inert gas at a temperature within the range of from about 170° F. to 325° F., preferably about 300° F. Better percolation yields are obtained if the temperature at which the adsorbed eluent components are removed is maintained below about 325° F. Tower 20 is provided with a jacket 41 through which heating fluid may be circulated to maintain the temperature of the bed at the desired level. This heating fluid is introduced to jacket 41 through line 42 and is withdrawn therefrom through line 43. Alternately, percolation tower 20 may be in the form of a heat exchanger, heating fluid being circulated through the tubes thereof, the catalyst being disposed as a bed on the shell side of the exchanger. Air in line 45 is picked up by compressor 46 and is passed through line 47 to the silica gel bed in percolation tower 20 for the removal of adsorbed and superficial alcohol and benzene from the silica gel, the temperature of the bed being maintained preferably at about 300° F., and the air containing alcohol and benzene vapors is passed from tower 20 through line 48. The air is preferably dried before being passed through the silica gel through which it is blown in an amount of about 20,000 cu. ft. per ton of gel for a period of from 1 to 2 hours. The gel bed is then cooled to ambient temperature and is then put on the on-stream cycle for the deodorization of the alkylate naphtha.

Percolation tower 50 is operated in parallel with tower 20. Thus, when tower 20 is on-stream for the deodorization of the alkylate naphtha, tower 50 is on the regeneration cycle, and conversely when tower 20 is on the regeneration cycle, tower 50 is on-stream for the deodorization of the naphtha. Thus, by proper adjustment of valves in lines 12, 15, 17, 22, 24, 47, and 51, a continuous process for the deodorization of the solvent naphtha, i. e., alkylate, can be attained.

The following examples demonstrate the effectiveness of silica gel for the removal of odor-affording contaminants from naphthas derived from heavy alkylate fractions.

*Example I*

A heavy alkylate fraction, obtained by alkylating a butene stream with isobutane in the presence of sulfuric acid, was subjected to fractional distillation in the presence of steam, to obtain a heart cut fraction boiling within the range of from about 350° F. to about 425° F. This "heart cut" of boiling range of about 350° F. to 425° F. was obtained by fractionating off about 17.5% of the total heavy alkylate charge as light ends and then eliminating about 25% of the charge as bottoms, which bottoms distill above about 425° F. This elimination by fractionation of light ends was carried out under reflux ratio of about 10:1 with reduced pressure, i. e., about 300 mm. The portion of the charge from which the 17.5% light ends had been removed was then subjected to a second fractionation in the presence of steam, the still bottom temperature being maintained below 350° F. and overhead product of 425° F. end point (ASTM Distillation) was thus obtained. The introduction of steam in this distillative fractionation step prevented cracking of the product during the distillation to eliminate as bottoms the 30% (based on light ends free alkylate).

This fraction, which had an objectionable kerosene-like odor, was percolated through silica gel in a combination circulator-regenerator column equipped with a jacket for maintaining in said jacket a constant boiling liquid for proper temperature control in the silica regeneration step of the experiment. The percolation rate was held at approximately 20 barrels per hour per ton of commercial grade silica gel of a particle size to pass through a #14 U. S. Standard sieve and to be retained on a #20 U. S. Standard sieve. Percolation was carried out at ambient temperature, i. e., about 80° F. to 90° F. The effluent from the bed was substantially odorless until a yield of about 30 barrels of deodorized naphtha per ton of silica gel had been obtained. The silica gel regeneration procedure consisted of percolating through the bed of spent silica gel at ambient temperatures a mixture of isopropyl alcohol and benzene. Equal volumes of isopropyl alcohol and benzene were used in making up this mixture and the amount of the mixture percolated through the bed of spent silica gel was equal in volume to the bulk volume of the silica gel in the bed. Following this step, the column was heated to 325° F. by a constant boiling liquid in the jacket of the column and dry air was blown through the gel to strip out adsorbed alcohol and benzene. Dry heated air was used at the rate of about 20,000 cu. ft. per ton per hour over a 1.5-hour period. The gel was then cooled to the above ambient temperature range and the percolation of the alkylate fraction was repeated for the production of additional odorless solvent in a second cycle. By this procedure, a silica life of 30 barrels per ton was realized for each of 4 successive cycles, without any loss of activity of the silica gel.

Mixtures consisting of equal volumes of isopropanol and toluene and mixtures of methanol with benzene were also used in the series of experiments for the removal of adsorbed odor-affording contaminant from the silica gel. It was found that these were as effective as the isopropanol-benzene mixture used in experiment 1 for the regeneration of the silica gel. On the other hand, methanol alone, benzene alone, toluene alone, and all of the low boiling alcohols when used alone and not in admixture with benzene or toluene were totally ineffective for the removal of adsorbed odor-affording contaminant from the silica gel. Light paraffinic petroleum naphtha per se was also ineffective and was not effective when used in combination with the low boiling alcohols.

*Example II*

The procedure followed in Example I was repeated with the following modifications. The naphtha feed to the silica gel bed was dried over calcium chloride, the volume of mixed alcohol-benzene used for washing the spent silica gel was doubled, i. e., the volume used was twice the bulk volume of the silica gel and the temperature of the air introduced to the bed to remove adsorbed alcohol and benzene was maintained at a lower level, i. e., at about 300° F. Regenerated silica gel from Example I was used in this example. The percolation yield was 50 barrels of odorless naphtha per ton of silica gel per cycle with no apparent loss in activity at the end of 16 cycles.

*Example III*

The heart cut obtained by the procedure of Example I was treated with 98% sulfuric acid in an amount of 30 pounds per barrel, during which treating step thorough mixing of acid with the heart cut alkylate was obtained by means of a mechanical stirrer. The acid treated heart cut was separated from the acid, was neutralized with aqueous caustic solution, and was then washed with water. This acid treated naphtha was then percolated through Attapulgus clay at 30 barrels per ton of clay. This treatment had not changed the distillation range of the naphtha. This "product" naphtha, finished according to the conventional method for preparing refined naphthas, i. e., acid treatment plus claying, still retained the kerosene-like odor and was not suitable for use as odorless naphtha.

*Example IV*

The acid treated-clayed product of Example III was percolated through silica gel according to the procedure and under the same conditions as those followed in Example I. A percolation yield of 60 barrels of odorless solvent naphtha per ton of silica gel for one cycle was obtained.

Thus, this example demonstrates that even the rigorous conventional treatment of the alkylate, i. e., acid treatment plus clay, will not produce a suitable solvent with respect to odor for the service required but if such conventional finishing procedure is followed by contact with silica gel an odorless product can be obtained at a good percolation yield.

Having thus described my invention, I claim:

1. The process for the production of odorless solvent which comprises (1) contacting at ambient temperature with silica gel a naptha feed, containing odor-affording contaminant and derived from hydrocarbons containing from 3 to 5 carbon atoms, said naphtha feed boiling within the range of from about 350° F. to 424° F. and being characterized by being essentially free of aromatics, sulfur compounds, and free sulfur, said contacting being at a rate within the range of from about 10 barrels to about 30 barrels of said feed per ton of silica gel per hour for a total contact of feed with said gel not in excess of about 50 barrels per ton of silica gel, (2) separating said naphtha from silica gel contacted in step 1 to obtain said solvent substantially free of said odor-affording contaminant, (3) contacting said silica gel with a mixture consisting of at least one alcohol having from 1 to 3 carbon atoms in admixture with at least one aromatic hydrocarbon selected from the class consisting of benzene and toluene, said mixture containing at least about 20% by volume and not more than about 80% by volume of said alcohol to obtain an alcohol-aromatic hydrocarbon solution of odor-affording contaminant, (4) separating said silica gel of step 3 from the alcohol-aromatic hydrocarbon solution of step 3, (5) removing adsorbed alcohol and aromatic hydrocarbon from the separated silica gel of step 4, (6) separating by distillative fractionation odor-producing contaminant from said alcohol-aromatic hydrocarbon solution of contaminant obtained in step 3, and (7) recycling said separated alcohol-aromatic hydrocarbon mixture of step 6 to step 3 of the process.

2. The process as described in claim 1 wherein the feed is an alkylate consisting essentially of a mixture of paraffinic hydrocarbons obtained by alkylating butenes with isobutane in the presence of sulfuric acid catalyst.

3. The process as described in claim 1 wherein the alcohol-aromatic hydrocarbon mixture consists essentially of these components in relative amounts to distill completely as an azeotropic mixture in step 6 of the process of claim 1.

4. The process of claim 1 wherein the alcohol is isopropyl alcohol and the aromatic hydrocarbon is benzene.

5. The process of claim 1 wherein adsorbed alcohol and aromatic hydrocarbon are removed from separated silica gel of step 4 by passing a current of substantially dry air in contact therewith at a temperature within the range of about 170° F. to 325° F.

6. The process as described in claim 1 wherein the alcohol-aromatic hydrocarbon mixture of step 3 is a mixture consisting of 50% by volume of the alcohol and 50% by volume of the aromatic hydrocarbon.

7. The process of claim 6 wherein the alcohol is isopropyl alcohol and the aromatic hydrocarbon is benzene.

8. The method for producing an odorless naphtha from an odor-contaminated fraction of butene-isobutane alkylate, said fraction being characterized by boiling within the range of about 350° F. to about 425° F., consisting essentially of branched chain paraffinic hydrocarbons and essentially free of sulfur-affording components which method comprises contacting said fraction at ambient temperatures with silica gel in an amount of not more than about 60 barrels of said fraction per ton of said silica gel before regeneration of said silica gel and separating decontaminated odorless naphtha from said silica gel.

9. The method as described in claim 8 wherein the fraction of alkylate is contacted with silica gel at a rate of about 10 to about 30 barrels of alkylate fraction per ton of silica gel per hour for a total contact of not more than about 60 barrels of the fraction of alkylate per ton of silica gel prior to regeneration thereof.

10. The method of claim 8 which includes the steps of restoring the adsorptive effectiveness of said silica gel for odor producing contaminant after an on stream period by washing said silica gel with a mixture consisting essentially of at least one alcohol having from 1 to 3 carbon atoms in admixture with at least one aromatic hydrocarbon having 6 to 7 carbon atoms, the ratio by volume of said alcohol to aromatic hydrocarbon in the admixture being in the range of about 20:80 to 80:20, and removing adsorbed alcohol and aromatic hydrocarbon from said silica gel prior to reuse of said silica gel for deodorizing further amounts of said alkylate fraction.

References Cited in the file of this patent

UNITED STATES PATENTS

| | | |
|---|---|---|
| 2,286,815 | Kiersted | June 16, 1942 |
| 2,571,380 | Penick | Oct. 16, 1951 |
| 2,651,594 | Blatz | Sept. 8, 1953 |

FOREIGN PATENTS

| | | |
|---|---|---|
| 427,805 | Germany | Apr. 20, 1926 |